United States Patent [19]

Kawamura

[11] Patent Number: 5,780,811
[45] Date of Patent: Jul. 14, 1998

[54] ELECTRICALLY HEATED DIESEL PARTICULATE FILTER

[75] Inventor: Hideo Kawamura, Samukawa-machi, Japan

[73] Assignee: Isuzu Ceramics Research Institute Co., Ltd., Kanagawa-ken, Japan

[21] Appl. No.: 751,937

[22] Filed: Nov. 19, 1996

Related U.S. Application Data

[63] Continuation of Ser. No. 340,423, Nov. 15, 1994, abandoned.

[30] Foreign Application Priority Data

Dec. 9, 1993 [JP] Japan ........................ 5-340355

[51] Int. Cl.⁶ ........................................ H05B 1/00
[52] U.S. Cl. ................ 219/205; 219/202; 219/206; 219/549; 55/DIG. 10; 55/DIG. 30
[58] Field of Search ................... 219/202, 205, 219/552, 553, 548, 504, 206, 549; 392/485, 486, 491; 55/DIG. 10, DIG. 30, 523, 212, 213, 217, 385.3

[56] References Cited

U.S. PATENT DOCUMENTS

| 2,065,760 | 12/1936 | Smith | 392/370 |
|---|---|---|---|
| 3,344,590 | 10/1967 | Smith et al. | 55/521 |
| 3,408,794 | 11/1968 | Stoddard | 55/DIG. 10 |
| 4,283,207 | 8/1981 | Martyniuk | 55/DIG. 30 |
| 4,397,772 | 8/1983 | Noakes et al. | 252/477 |
| 4,423,309 | 12/1983 | Murphy et al. | 219/270 |
| 4,455,823 | 6/1984 | Bly et al. | 55/DIG. 30 |
| 5,258,164 | 11/1993 | Bloom et al. | 55/DIG. 30 |
| 5,288,975 | 2/1994 | Kondo | 219/552 |
| 5,298,046 | 3/1994 | Peisert | 55/DIG. 10 |
| 5,457,945 | 10/1995 | Adiletta | 55/DIG. 10 |
| 5,475,203 | 12/1995 | McGaffigan | 219/548 |

FOREIGN PATENT DOCUMENTS

| 275372 | 7/1988 | European Pat. Off. |
|---|---|---|
| 0484593 | 5/1992 | European Pat. Off. |
| 3744265 | 7/1989 | Germany |
| 1136617 | 9/1989 | Japan |
| 1144427 | 10/1989 | Japan |
| 3-62493 | 3/1991 | Japan ........................ 219/553 |
| 3116722 | 12/1991 | Japan |
| 9318841 | 9/1993 | WIPO |

OTHER PUBLICATIONS

Engish Translation of Nakanouchi (JP 3-62493).

English Translation of Gurtler (EPO 275272).

"The Random House College Dictionary" (REVD, 1980), p. 721.

Japan Abstract No. 57 163 112, Device for Disposing Particles in Exhaust ... Same, vol. 7, No. 1, Oct. 7, 1982.

Japan Abstract No. 58 143 815, Filter for Exhaust Gas, vol. 7, No. 259, Aug. 26, 1983.

*Primary Examiner*—Michael L. Gellner
*Assistant Examiner*—Karl Easthom
*Attorney, Agent, or Firm*—Browdy and Niemark

[57] ABSTRACT

This diesel particulate filter comprises of a composite filter plate composed of thin filter plates formed out of ceramic fiber, and a latticed heating wire, and metal nets. The composite filter plate is bent into a bellows-like structure so as to increase a cross-sectional area of an exhaust gas passage. The latticed heating wire is formed to a current self-controlling type heating wire out of a material containing Ni as a main component the resistance value of which increases as the temperature rises. The particulates collected by the thin filter plates are burnt by supplying an electric current to the latticed heating wire. When a high-temperature region occurs on the thin filter plates, the level of an electric current flowing to the portion of the latticed heating wire which corresponds to the same region is reduced. Consequently, all the regions of the thin filter plates are heated at a uniform temperature, and the melting and breakage of the thin filter plates do not occur.

5 Claims, 2 Drawing Sheets

5,780,811

1
ELECTRICALLY HEATED DIESEL PARTICULATE FILTER

This application is a continuation of application Ser. No. 08/340,423, filed Nov. 15, 1994, now abandoned.

BACKGROUND OF THE INVENTION

1. Field of the Invention

This invention relates to a diesel particulate filter capable of purifying an exhaust gas by collecting particulates contained in an exhaust gas discharged from a diesel engine, and burning the same by heating.

2. Description of the Prior Art

The combustion of a diesel engine is based on the so-called heterogeneous mixing of air with a fuel in which a fuel is injected into high-temperature and high-pressure air. In a heterogeneous gaseous mixture, air and fuel are not uniformly mixed unlike those in a homogeneous gaseous mixture. Therefore, the carbon components in a fuel turn into soot and HC due to the high-temperature combustion heat, and the soot and HC are coagulated and turned into particulates, which are discharged into and float in the atmospheric air to cause environmental pollution.

An exhaust gas particulates removing apparatus for diesel engines in which two sets of filters of a porous honeycomb structure formed out of, for example, cordierite ($2MgO \cdot 2Al_2O_3 \cdot 5SiO_2$) are parallel-arranged in an exhaust passage has been disclosed as a conventional apparatus for treating an engine exhaust gas. This exhaust gas particulates removing apparatus for diesel engines is adapted to pass an exhaust gas through one filter of a honeycomb structure, collect carbon, which is contained in the exhaust gas, in the filter, interrupt the passing of the exhaust gas through the filter when the filter is clogged with the carbon collected therein and switch the direction of the flow of the exhaust gas so that it passes through the other filter, send the air to the clogged filter from the downstream side thereof, and heat the same filter so as to burn the carbon with which the filter is clogged. Such an exhaust gas particulates removing apparatus for diesel engines is disclosed in, for example, Japanese Utility Model Laid-Open No. 144427/1989.

Japanese Utility Model Laid-Open No. 136617/1989 discloses a particulate filter. This particulate filter comprises of thin porous elements composed of a conductive ceramic material, serving also as heaters and arranged in a plurality of stages, and are formed so that electric power can be supplied to each porous element separately and controlled individually.

Japanese Utility Model Laid-Open No. 116722/1991 discloses an exhaust gas purifying apparatus for diesel engines. This exhaust gas purifying apparatus for diesel engines has a columnar ceramic filter in which a plurality of lengthwise extending cells are formed, and an electric heating member provided on the outer circumference of the filter. Some of the cells mentioned above are filled with powder of a high heat conductivity.

The diesel particulates consist of a synthesized product of carbon and hydrocarbon contained in a diesel engine exhaust gas, and the sizes thereof range from several microns to several ten microns. These particulates react with oxygen and are burnt easily but heat of a high temperature is required to burn the particulates. Therefore, the particulates cannot be burnt perfectly by the heat of an exhaust gas alone. In a DPF in which the carbon contained in an exhaust gas discharged from a diesel engine is collected by a filter member and burnt, the burning of particulates such as soot is done by heating the carbon collected by the filter member and deposited thereon at a predetermined level with an ignition glow plug or a heater. In a DPF, diesel particulates are collected generally by a ceramic filter member the pore diameter of which is usually 30–40 μm.

SUMMARY OF THE INVENTION

A primary object of the present invention is to solve these problems, and provide a diesel particulate filter which has a filter body disposed in an exhaust system in a diesel engine and adapted to collect particulates contained in an exhaust gas passing therethrough, and a heating wire for heating and burning the collected particulates, and which is capable of improving the particulate collecting efficiency by using thin filter plates of a ceramic fiber material for collecting particulates floating in a combustion gas from a diesel engine, and also heating the filter body uniformly in a short period of time while self-controlling an electric current flowing through the heating wire during the regeneration of the filter body, whereby the particulates are heated and burnt.

Another object of the present invention is to provide a diesel particulate filter characterized in that it comprises of a composite filter plate composed of thin filter plates formed out of a ceramic fiber material, such as SiC and $Al_2O_3$, and a latticed heating wire disposed in an opposed state with respect to the thin filter plates and having a current self-controlling action capable of controlling the level of an electric current in accordance with a temperature, and metal nets put on the outer surfaces of the thin filter plates.

When this composite filter plate is bent sequentially into a bellows-like structure, a cross-sectional area of an exhaust gas passage which can be formed in a space of a predetermined volume can be increased, and an exhaust gas passing through the composite filter plate is caught by the portions of the thin filter plates at which fibers cross one another, so that the particulates contained in the exhaust gas are collected with a high efficiency. In the ceramic fiber constituting the thin filter plates, fibers cross one another, and particulates including carbon, soot and HC are caught by the crossed portions of the fibers. Namely, these crossed portions have particulates collecting effect, and this particulate filter therefore has a higher particulate collecting efficiency than a conventional porous honeycomb filter.

The latticed heating wire is connected from one end to the other through parallel-arranged terminals, and an electric current supplied to this heating wire is controlled in response to the amount of the particulates collected on the composite filter plate. The amount of the collected particulates can be detected easily by measuring a pressure loss of exhaust gas with a pressure sensor, and a proper regenerating treatment for the composite filter plate can therefore be carried out.

The outer surfaces of the latticed heating wire and metal nets are coated with a ceramic material of a high thermal resistance and a high oxidation resistance. Accordingly, even when the latticed heating wire and metal nets are exposed to an exhaust gas, they are not oxidized and deteriorated, so that the durability and lifetime of these parts can be set high and long.

In order to regenerate the composite filter plate by heating and burning the particulates collected thereby, an electric current is supplied to the latticed heating wire. Consequently, the composite filter plate is heated uniformly in a short period of time, and the collected particulates are heated and burnt speedily, whereby the composite filter plate is regenerated. During this time, the level of an electric current supplied to the latticed heating wire is self-controlled in accordance with the temperature of the thin filter plates. Therefore, when a temperature required to burn the particulates is attained, a resistance value increases, and the level of an electric current is controlled. Therefore, the electric current flows through a low-temperature portion of the latticed heating wire with the temperature of a high-temperature portion thereof maintained as it is, so that the composite filter plate is heated necessarily uniformly. This prevents the thin filter plates from being melted and broken.

It is necessary that the thin filter plates on which particulates are collected be regenerated by heating and burning the same particulates. When, for example, the latticed heating wire mentioned above is buried in the thin filter plates, the thin filter plates can be heated uniformly and speedily by supplying an electric current to the latticed heating wire, the particulates thus heated being turned into gases of $CO_2$ and $H_2O$ and burnt.

The latticed heating wire can also be provided in a sandwiched state between a pair of adjacent thin filter plates, and, in this case, the thin filter plates are heated uniformly with the latticed heating wire, and are not partially. The latticed heating wire can also be provided on those outer surfaces of the thin filter plates, which are on the upstream side of these plates, so that the heating function and construction of the latticed heating wire can be improved and simplified.

Since the latticed heating wire is formed out of a material containing Ni as a main component to which an electric current can be supplied at a reduced rate in a high-temperature region and at a high rate in a low-temperature region, it has a current self-controlling action capable of controlling the level of an electric current in accordance with the temperature. The resistance value of a Ni wire increases as the temperature thereof rises. Accordingly, when a Ni wire is connected in a latticed state, an electric current flows through a low-temperature region, and does not through a high-temperature region. Namely, the Ni wire forms a current self-controlling heater having a uniform temperature distribution. Therefore, a locally overheated region does not occur in the thin filter plates, and the thin filter plates are not melted and broken.

When the latticed heating wire is formed to a current self-controlling type, an electric current can be supplied to a low-temperature region of thin filter plates at a normal rate, and to a high-temperature region at a reduced rate. For example, when an electric current is supplied to the latticed heating wire with particulates locally collected on the thin filter plates, the portion of the thin filter plates in which a large amount of particulates are collected is subjected to the burning of the particulates to cause a high-temperature region thereon, and the level of the electric current flowing through the portion of the latticed heating wire which corresponds to this high-temperature region is reduced with a higher level of electric current flowing to the other portion of the heating wire. As a result, the whole surface of the composite filter plate is heated to a uniform temperature, and the overheating does not occur on the thin filter plates. Accordingly, the melting and breakage of the thin filter plates do not occur.

The outer surfaces of the thin filter plates are covered with metal nets. Therefore, when the thin filter plates are bent to a bellows-like structure, the shape of the plates can be retained excellently, and the strength of the composite filter plate can be increased. Moreover, when an electric current is supplied to the latticed heating wire, the whole surface of each thin filter plate can be heated uniformly since the metal nets have a high thermal conductivity and function as thermal conductive members.

When the collected particulates are heated and burnt so as to regenerate the composite filter plate, an electric current is supplied to the latticed heating wire, whereby the composite filter plate is heated uniformly in a short period of time. Consequently, the particulates are burnt speedily, and the composit filter plate is regenerated. This enables a resistance of the composite filter plate against a flow of exhaust gas to be reduced at all times, and the occurrence of a decrease in the particulates collecting efficiency to be prevented.

DESCRIPTION OF THE PREFERRED EMBODIMENT

Figure 1:
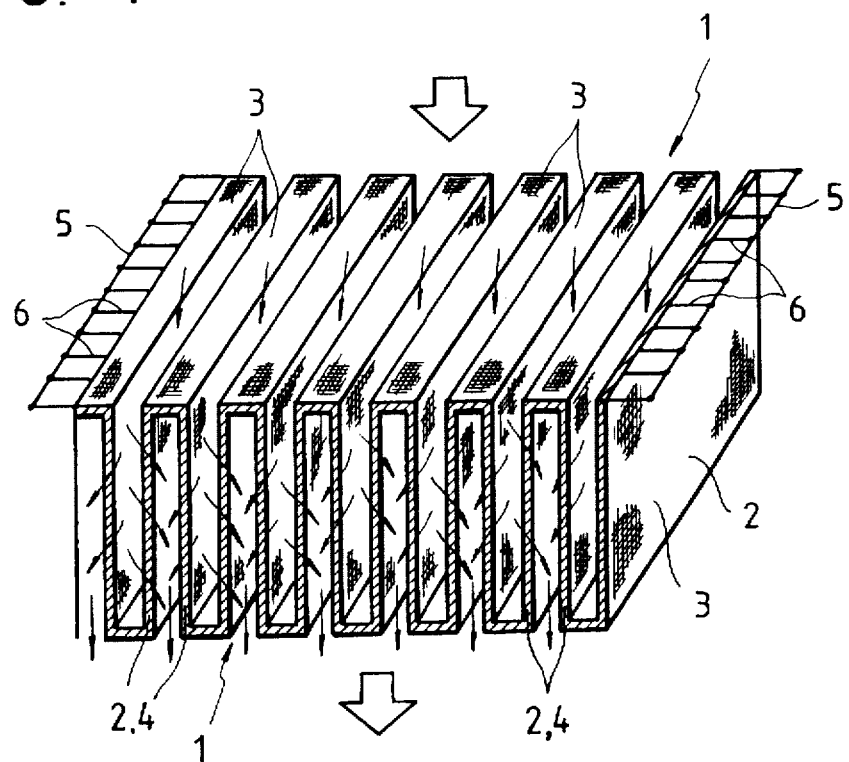
FIG. 1 is a schematic perspective view of an embodiment of the diesel particulate filter according to the present invention.

An embodiment of the diesel particulate filter according to the present invention will now be described with reference to the drawings.

This diesel particulate filter is housed in a casing provided in an exhaust system including an exhaust pipe into which an exhaust gas from a diesel engine is introduced; adapted to collect particulates contained in an exhaust gas passing through the casing; and capable of disposing the collected particulates by burning the same. This diesel particulate filter comprises mainly of a composite filter plate 1 composed of thin filter plates 2 and a latticed heating wire 4 provided in contact with the thin filter plates 2, and metal nets 3 put on the outer surfaces of the thin filter plates 2. When the composite filter plate 1 is placed in the casing, the cross-sectional area of a passage through which an exhaust gas passes increases. Therefore, the composite filter plate 1 is bent sequentially into a bellows-like structure.

In this diesel particulate filter, the thin filter plates 2 are formed out of a ceramic fiber material, such as SiC and $Al_2O_3$ which has a high thermal resistance and a high oxidation resistance. The latticed heating wire 4 is formed out of a material having a high resistance temperature coefficient, for example, a material containing Ni as a main component, and has a current self-controlling action capable of controlling the level of an electric current in accordance with a temperature. According to what are shown in the drawings, the latticed heating wire 4 provided in the particulate filter is sandwiched between a pair of adjacent thin filter plates 2. The composite filter 1 has the latticed heating wire 4 held between a pair of adjacent thin filter plates 2, which are covered at their outer surfaces with a metal net 3, the resultant product being preferably combined fixedly by metal wires as shown by seams 11, in such a manner that short-circuiting does not occur. The latticed heating wire 4 may be buried in the interior of the thin filter plates 2 when occasion demands. To be exact, the latticed heating wire 4 is formed out of a material containing Ni as a main component which is capable of reducing the level of an electric current in a high-temperature region and supplying a large quantity of electric current thereto in a low-temperature region. Since the outer surfaces of the latticed heating wire 4 and metal nets 3 are exposed to an exhaust gas, they are coated with a ceramic material of a high thermal resistance and a high oxidation resistance.

Figure 2:
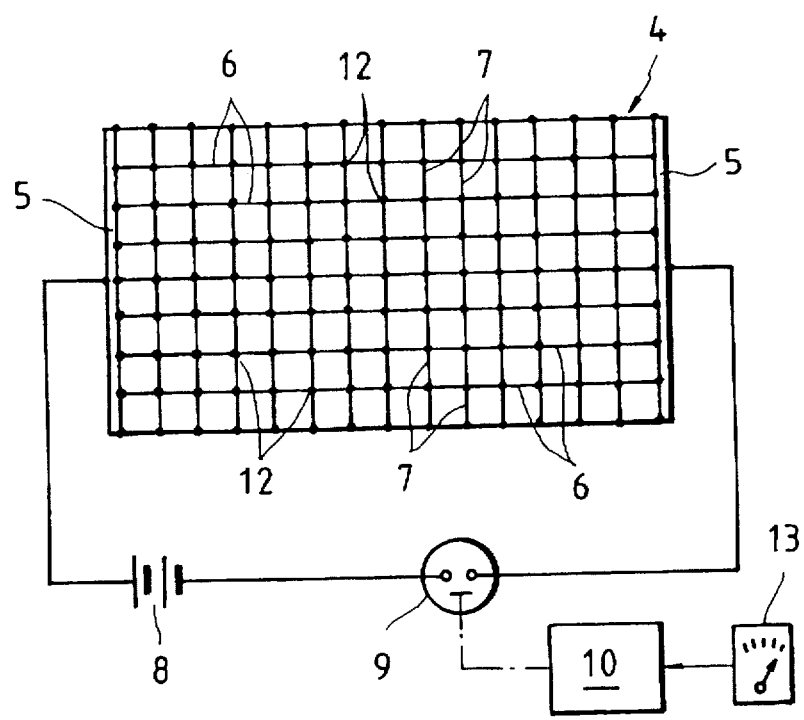
FIG. 2 is a plan view of a latticed heating wire provided in the diesel particulate filter of FIG. 1.
Figure 3:
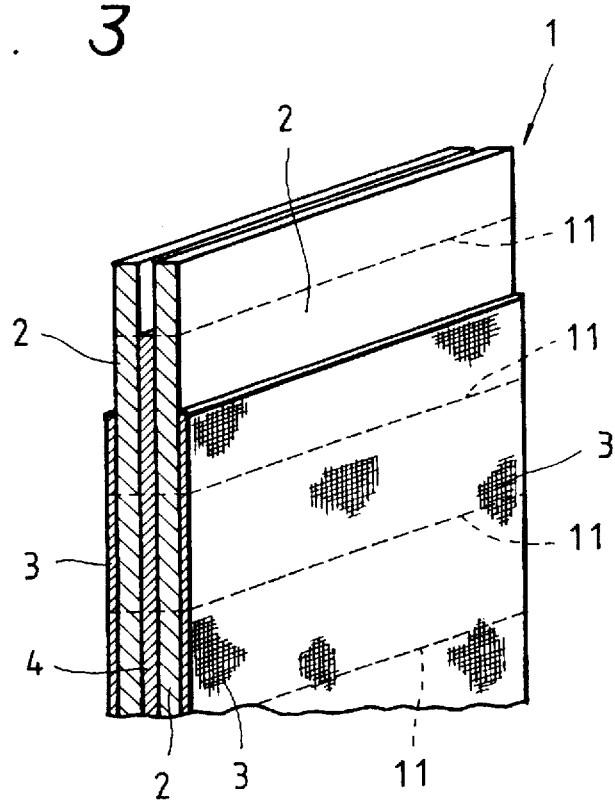
FIG. 3 is a sectioned schematic perspective view illustrating an example of the construction of an inner portion of a composite filter plate in the diesel particulate filter of FIG. 1.

In the latticed heating wire 4, an electric current is controlled in response to the amount of the particulates collected by the composite filter plate 1. As shown in FIG. 2, the latticed heating wire 4 comprises of a plurality of lateral metal wires 6 extending in parallel with one another between terminals 5, and parallel-extending longitudinal metal wires 7 crossing the lateral metal wires 6, which wires 6, 7 are welded at the intersections 12 with connection made by a parallel circuit from one terminal 5 to the other 5. In FIG. 2, both ends of each lateral metal wire 6 are joined to the terminals 5, which are connected to a power source 8 through a switch 9. The turning on and off of the switch 9 is controlled in accordance with an instruction from a controller 10. The controller 10 is constructed so as to control the turning on and off of the switch 9 in response to, for example, the amount of the particulates collected by the thin filter plates 2. The amount of collected particulates can be detected by measuring an exhaust gas pressure in the exhaust system with a pressure sensor 13.

When a predetermined amount of particulates are collected by the composite filter plate 1, it is necessary that the composite filter plate 1 be regenerated by burning the collected particulates. The exhaust gas is then introduced into another exhaust passage in accordance with an instruction from the controller 10, and the switch 9 is turned on to supply the electric power from the power source 8 to the latticed heating wire 4 through the terminals 5. When the latticed heating wire 4 is turned on, the composite filter plate 1 is heated uniformly in short period of time, and the collected particulates are burnt speedily, whereby the composite filter plate 1 is regenerated. During this time, the level of the electric current supplied to the latticed heating wire 4 is self-controlled in accordance with the temperature of the thin filter plates 2. Accordingly, the composite filter plate 1 is heated uniformly, and the thin filter plates 2 are not melted and broken.

Since the latticed heating wire 4 is formed out of a material containing Ni as a main component having a current self-controlling action capable of controlling the level of an electric current in accordance with a temperature, it is possible to supply an electric current thereto in a low-temperature region, and reduce the level of the electric current in a high-temperature region. Therefore, for example, when particulates are collected locally on a certain region of the thin filter plates 2 with the latticed heating wire 4 in an ON-state, the portion alone of the thin filter plates 2 on which particulates are collected in large quantities is burnt to cause the temperature of this portion to become high. Consequently, the electric current flows to other portions of the heating wire 4 keeping away from the high-temperature region thereof, so that the high-temperature region does not receive heat from the latticed heating wire 4. As a result, the whole surface of the composite filter plate 1 is heated substantially uniformly, and the melting and breakage of the thin filter plates 2 do not occur.

The outer surfaces of the thin filter plates 2 are covered with the metal nets 3. Therefore, when the thin filter plates 2 are folded into a bellows-like structure, the shape of the structure can be retained reliably, and the strength of the composite filter plate 1 can be improved. Moreover, when an electric current is supplied to the latticed heating wire 4, the metal nets 3 which have a high thermal conductivity function as thermal conductive members, so that the whole surface of each of the thin filter plates 2 can be heated uniformly.

Figure 4:
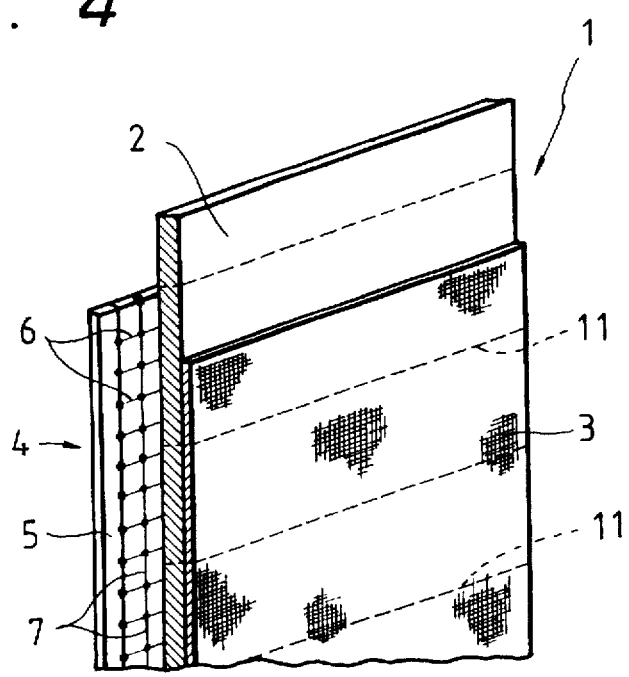
FIG. 4 is a schematic perspective view illustrating another example of the construction of an inner portion of a composite filter plate in the diesel particulate filter according to the present invention.

Another embodiment of the diesel particulate filter according to the present invention will now be described with reference to FIG. 4. FIG. 4 is a schematic perspective view illustrating another example of the construction of an inner portion of a composite filter plate in the diesel particulate filter according to the present invention. This embodiment has the same construction as the previously described embodiment except that the thin filter plates 2 on the upstream side with respect to the flow of an exhaust gas are removed. Since the construction of the remaining portion of this embodiment is identical with that of the corresponding portion of the previously described embodiment, the same parts are designated by the same reference numerals, and duplicated descriptions are omitted. In the embodiment of FIG. 4, the latticed heating wire 4 is provided on those surfaces of the thin filter plates 2 which are on the upstream side of these plates. In this embodiment, the construction and function of the particulate filter are simplified.

What is claimed is:

1. A diesel particulate filter comprising a filter body disposed in an exhaust system of a diesel engine having a power supply, said filter body adapted to collect particulates from an exhaust gas passing through said diesel engine, said filter body having a heating wire for heating and burning said particulates collected in said filter body, wherein, said filter body comprises a composite filter plate composed of adjacent thin filter sheets and metal nets engaged on both sides of outer surfaces of said thin filter sheets, said thin filter sheets formed of a ceramic fiber material in which fibers cross one another, said heating wire comprising a latticed heating wire disposed between and in contact with said adjacent thin filter sheets, wherein said thin filter sheets, metal nets and said heating wire all are laminated together, wherein said composite filter plate is bent serpentinely into a form of bellows together with said heating wire which is in contact with said thin filter sheets, wherein said latticed heating wire is formed of a material of a high resistance temperature coefficient which contains Ni as a main component capable of reducing the level of an electric current in a high-temperature region while supplying a large amount of electric current in a low-temperature region, wherein outer surfaces of said latticed heating wire are coated with a ceramic material which has thermal resistance and oxidation resistance, and wherein said latticed heating wire comprises lateral metal wires extending in parallel with one another between two parallel-arranged terminals, and parallel-extending longitudinal metal wires crossing said lateral metal wires, said lateral and longitudinal metal wires being joined with one another at their intersections, said latticed heating wire constituting a current self-controlling means for controlling the level of an electric current, responsive to local temperature created by burning particulates and providing variations in current at different locations and uniform temperature across the area of said latticed heating wire, whereby the level of an electric current supplied to said latticed heating wire is controlled at different locations in response to amounts of particulates collected on said laminated composite filter plate at said different locations.

2. A diesel particulate filter according to claim 1, wherein said latticed heating wire is provided on those surfaces of said thin filter plates which are on the upsteam side of said thin filter plates in a flow of an exhaust gas.

3. A diesel particulate filter according to claim 1 wherein said metal nets are coated with a ceramic material of a high thermal resistance and a high oxidation resistance.

4. A diesel particulate filter according to claim 1 wherein said fibers of said ceramic fiber material are made of any one of SiC and $Al_2O_3$, said diesel particulate filter further comprising a switch for turning on and off electric current supply to said heating wire, and a controller for controlling the turning on and off of said switch in response to an amount of particulates collected by said composite filter plate.

5. A diesel particulate filter according to claim 1 wherein said bellows-like structure comprises a plurality of sections having a plurality of generally parallel extending walls.

* * * * *